2,822,396

PRODUCTION OF AMINES

Walter Theodore Dent, Norton-on-Tees, England, assignor to Imperial Chemical Industries Limited, London, England, a corporation of Great Britain No Drawing. Application February 21, 1955
Serial No. 489,810

Claims priority, application Great Britain March 5, 1955

4 Claims. (Cl. 260—577)

This invention relates to the production of amines.

It has already been proposed to produce amines having a structure:

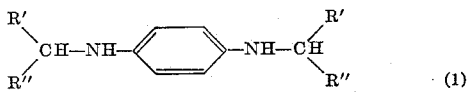
(1)

where R' and R" are alkyl, aryl, aralkyl or cycloalkyl groups, by reducing p-nitraniline in the presence of a ketone R'.CO.R". For example, N,N'-di-sec.butyl-p-phenylene-diamine may be produced by reducing p-nitraniline in the presence of methyl ethyl ketone. This process has the disadvantages that:

(a) p-Nitraniline is difficult to prepare, and in consequence, it is a relatively expensive starting material.

(b) The customary methods of producing p-nitraniline may result in this compound containing chlorine-containing impurities. These impurities cause poisoning of the catalyst employed in the reduction of the p-nitraniline in the presence of a ketone.

The present invention provides a process for producing amines of the type disclosed above, which overcomes the disadvantages hereinbefore described.

Thus, according to the present invention, amines having a structure:

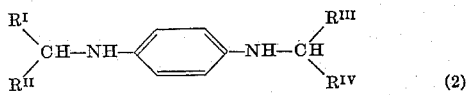
(2)

where $R^I$, $R^{II}$, $R^{III}$ and $R^{IV}$ are alkyl, aralkyl, or aryl groups or are members of cyclo-alkyl radicals, are produced by reacting an amine having a structure:

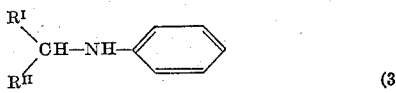
(3)

with a benzene diazonium salt, whereby an azo compound having a structure:

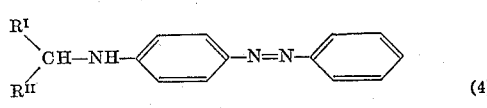
(4)

is produced, hydrogenating this azo compound in the presence of a ketone $R^{III}.CO.R^{IV}$, whereby amines having structures:

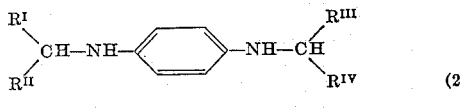
(2)

and

(5)

are produced simultaneously.

For simplicity, when reference is made later in this specification to the compounds depicted above, the numbers given in brackets will be used.

It is an important feature of the present invention that by using a ketone $R^{III}.CO.R^{IV}$ in which $R^{III}$ is identical with $R^I$ and $R^{IV}$ is identical with $R^{II}$, the amine (5) is identical with starting material (3), and this amine (5) can in consequence be separated and re-used in the process.

The process of the present invention may be used, for example, for the production of N,N'-di-sec.butyl-p-phenylenediamine; N-sec.butylaniline may be reacted, if desired in the presence of an organic solvent such as methanol, with benzene diazonium chloride, whereby p-N-sec.butyl-amino-azo-benzene is produced; this azo compound, on reduction in the presence of methyl ethyl ketone gives rise to a mixture of N,N'-di-sec.butyl-p-phenylene-diamine and N-sec.butyl-aniline. The N,N'-di-sec.butyl-p-phenylene-diamine is separated and the N-sec.butyl-aniline may be recycled for reaction with benzene diazonium chloride.

Similarly, using N-isopropyl-aniline and acetone, N,N'-di-isopropyl-p-phenylene-diamine may be obtained.

It will be understood that in the process of the present invention, any suitable benzene diazonium salt may be employed, but it is preferable to use either the chloride or bromide. It will also be understood that substituted benzene diazonium salts may be used; a substituent group present in the diazonium salt appears not in the amine having a structure (2) but in the amine having a structure (5). Substituent groups in the diazonium salt may facilitate the coupling reaction between the diazonium salt and the amine having a structure (3). The amine have a structure (3) used in the process of the present invention may contain alkyl or alkoxy substituents in the ortho and meta positions to the substituted amino group.

In a modified form of the process of the present invention, the azo compound which is obtained from the coupling reaction in the form of a salt is treated, without a prior separation, with sodium nitrite and hydrochloric acid. When, for example, the azo compound is the hydrochloride of p-N-sec.butyl-amino-azo-benzene, this on reaction with sodium nitrite gives a compound having the structure:

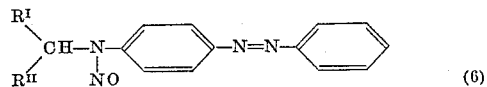
(6)

This compound is neutral in reaction and is insoluble in water, and in methanol. It therefore separates readily from a reaction mixture using methanol as solvent. On the other hand, the hydrochloride of the azo compound itself is soluble in methanol, but the free azo compound may be isolated by the addition of concentrated aqueous ammonia. The nitroso compound having the structure (6), on reduction in the presence of a ketone at a temperature of, for example, 160° C. gives rise to the same amines as the azo compound having a structure (4) when the latter is treated in the same manner; during this process, the nitroso group is apparently removed by hydrogenation.

The reaction between the amine having a structure (3) and the diazonium salt is conveniently carried out by adding an aqueous methanolic solution of a benzene diazonium chloride to a methanolic solution of the amine having a structure (3). The reaction is preferably carried out at a temperature of the order of 0° C. The use of a 30% to 50% excess of benzene diazonium chloride over that stoichiometrically required as beneficial. As an example of the reaction, benzene diazonium chloride and N-sec.butyl-aniline yield p-N-sec.butyl-amino-azo-benzene hydrochloride. As disclosed above, this compound is converted to the free base by reaction with an alkali, or it is converted to the nitroso compound having a structure:

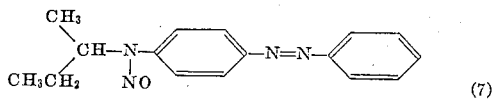
(7)

The free base (p-N-sec.butyl-amino-azo-benzene) or the nitroso compound having a structure (7), prior to reduction in the presence of ketone, should be freed, as completely as possible, from traces of organic compounds containing chlorine, since chlorine is deleterious to the activity of the catalysts which may be used in the reduction process. The substantial removal of chlorine-containing compounds may be effected either by solvent extraction, or by contacting a solution of the azo compound having a structure (4) or the nitroso compound having a structure (6) with an anion exchange resin.

Catalysts suitable for use in the reduction step include those comprising copper, or a metal selected from group VIII of the periodic system. In particular, copper chromite, finely divided nickel, and finely divided platinum or platinum oxide are convenient. When using a finely divided nickel or platinum catalyst, this may be supported on a suitable inert material.

The reductive alkylation step is preferably carried out continuously in the liquid phase at a temperature within the range of 100° to 180° C., and at a pressure of 10 to 300 atmospheres gauge. In particular, reaction at a temperature of 120° to 160° C. and at a pressure of 30 to 100 atmospheres gauge gives good results.

The amines produced are preferably separated by fractional distillation, the lower amine having a structure (5) being separated from the desired amine having a structure (2). The recovered lower amine having a structure (5) may then, if suitable, be re-used in the present process. If desired, aniline may be added to the reactants prior to carrying out the reductive alkylation step. In this way, an additional quantity of amine (5) is produced, and this will replenish losses incurred in operation.

The present process has the advantages over the process which uses p-nitraniline as the starting material in that the starting material is a readily accessible N-alkyl aniline having a structure (3), whereas suitable chlorine-free p-nitraniline is costly and difficult to obtain.

The amines having a structure (2) may be used as antioxidants. They may be used in stabilising compounds liable to deterioration arising from peroxide formation, such as petrols, aldehydes ethers, esters of unsaturated carboxylic acids and unsaturated hydrocarbons or mixtures containing these materials. The antioxidants should be present in an amount of 0.0002 to 3% by weight of the substances to be stabilised and more preferably in an amount of 0.001 to 0.3% by weight.

*Example 1*

22.4 grams of aniline were dissolved in 200 ml. of methanol and 44 ml. of concentrated hydrochloric acid. The aniline was diazotised by the addition of 16.8 grams of sodium nitrite dissolved in 18 ml. of water, the temperature during the diazotisation being maintained at 0 to 5° C. After the addition of 29.8 grams of N-sec.butyl-aniline dissolved in 100 ml. of methanol, the reaction mixture was allowed to stand for 4 hours at about −10° C. The reaction mixture was then diluted with 900 ml. of water, basified with excess aqueous ammonia and the insoluble oil continuously extracted with petroleum ether (boiling point 60° to 80° C.). Subsequent removal of the petroleum ether by distillation gave a red viscous oil, which, on trituration with 50 ml. of petroleum ether (boiling point 40° to 60° C.) gave 40 grams of a crystalline solid, the yield being 79%, based on N-sec.butyl aniline. This on recrystallisation had a melting point of 54° to 55° C., and was identified as 4-sec.butyl-amino-azobenzene.

39 grams of the crude 4-sec.butylaminoazobenzene produced as described in the preceding paragraph, 500 ml. of methyl ethyl ketone and 1 gram of a 30% by weight platinum-on-charcoal catalyst were heated at a maximum pressure of 100 atmospheres hydrogen for 8 hours at 60° C. followed by 16 hours at 160° C. After filtration and removal of light ends, the product was distilled at a pressure of 0.6 mm. Hg to give the following fractions:

Boiling point: Weight, grams
(i) 40°–60° C _____ 21.6
(ii) 90°–116° C _____ 0.5
(iii) 116°–122° C _____ 27.0
(iv) 122°–140° C _____ 2.0

From fraction (i), after dissolving in petroleum ether, treating the solution with gaseous hydrogen chloride and crystallising from an acetone/ethyl acetate mixture, 22 gm. of N-sec.butyl-aniline hydrochloride were obtained; this corresponds to a yield of 77%.

Fractions (iii) and (iv) were found to be substantially pure N,N'-di-sec.butyl-p-phenylenediamine, the yield of which was 85%.

*Example 2*

A solution of 10 gm. of aniline in 100 ml. of methanol and 25 ml. of concentrated hydrochloric acid was diazotised at 0° to 5° C. with 7.8 grams of sodium nitrite dissolved in 10 ml. of water. The resultant solution was poured into a solution of 15 grams N-sec.butyl-aniline dissolved in 100 ml. methanol. After the solution had stood for 1½ hours at 0° to 10° C., a further 200 ml. methanol and 25 ml. concentrated hydrochloric acid were added, and the mixture nitrosated at 0° C. with a saturated solution of sodium nitrite. A copious precipitate was formed, and complete nitrosation was indicated by a change in colour from red to orange. The solid was filtered off and washed with methanol, aqueous ammonia and water to yield 22 grams of 4-N-(nitroso-sec.butyl)-aminoazobenzene, melting point, after recrystallisation, 61.5°–62° C., yield 77.5%.

20 grams of 4-N-(nitroso-sec.butyl)aminoazobenzene, 500 ml. of methyl ethyl ketone and 1 gram of a 30% by weight platinum-on-charcoal catalyst were heated under a maximum hydrogen pressure of 100 atmospheres for 24 hours at a temperature of 160° C. After filtration and the removal of the light ends by distillation, the product was distilled at a pressure of 1.5 mm. Hg to give: (i) a fraction, weighing 12 grams, boiling at 60° to 135° C.; (ii) a fraction, weighing 12.8 grams, boiling at 135° to 140° C.

Fraction (i) was shown to be predominantly N-sec.-butyl-aniline. Fraction (ii) was substantially pure N,N'-sec.butyl-p-phenylene diamine, yield 82%.

*Example 3*

Example 1 was repeated using 27 grams N-isopropyl aniline in place of the N-sec.butyl-aniline. The product was basified with excess aqueous ammonia and extracted with ether. The ether was distilled off and the residue extracted with petroleum ether (boiling point 60° to 80° C.). 38 grams of 4-isopropyl-aminoazobenzene, melting point 70° to 75° C. were obtained.

223 grams of 4-isopropyl-aminoazobenzene, produced in the manner described above, and 500 mls. of acetone were hydrogenated in the presence of 3 grams of a catalyst comprising 30% by weight of platinum supported on charcoal at a hydrogen pressure of 100 atmospheres for 8 hours at 60° C., followed by 16 hours at 160° C. After filtration to remove the catalyst, the product was distilled; the fraction boiling between 108° and 118° C. at 1 mm. Hg pressure weighed 96 grams and solidified on cooling to a solid, melting point 46° to 48° C. This solid was substantially pure N,N'-di-isopropyl-p-phenylenediamine. The yield of this compound was 53%.

I claim:

1. A process for the production of diamines having the formula:

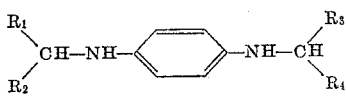

wherein $R_1$, $R_2$, $R_3$ and $R_4$ are aliphatic-saturated hydrocarbon groups which comprises coupling an amine having the formula:

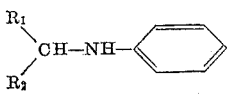

with a 30 to 50% excess of a benzene diazonium salt and thereby forming an azo compound having the formula:

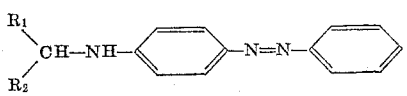

treating this compound with aqueous nitrous acid at a temperature in the region of the freezing point of water, thereby forming the nitroso compound

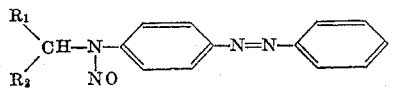

and reductively alkylating this compound in the presence of an aliphatically-saturated ketone of the formula $R_3$—CO—$R_4$, where $R_3$ and $R_4$ are aliphatically-saturated hydrocarbon radicals, and a hydrogenating metal catalyst selected from the group consisting of copper and the metals of group VIII and at a temperature in the range from 100° to 180° C. and at a pressure in the range from 10 to 300 atmospheres gauge, whereby the aforesaid diamine product is obtained simultaneously with the amine of the formula:

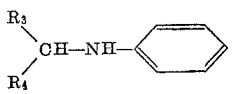

2. The process of claim 1 wherein said ketone is butanone-2.

3. The process of claim 1 wherein said ketone is acetone.

4. The process of claim 1 wherein $R_1$ and $R_2$ are the same and $R_3$ and $R_4$ are the same.

References Cited in the file of this patent
UNITED STATES PATENTS

| | | |
|---|---|---|
| 2,388,606 | Emerson | Nov. 6, 1945 |
| 2,388,608 | Emerson | Nov. 6, 1945 |
| 2,414,031 | Emerson | Jan. 7, 1947 |
| 2,714,104 | Chenicek et al. | July 26, 1955 |